(12) United States Patent  (10) Patent No.: US 8,531,375 B2
Komori  (45) Date of Patent: Sep. 10, 2013

(54) DISPLAY DEVICE

(75) Inventor: Fumiaki Komori, Isumi (JP)

(73) Assignees: Hitachi Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 840 days.

(21) Appl. No.: 12/379,406

(22) Filed: Feb. 20, 2009

(65) Prior Publication Data

US 2009/0243990 A1 Oct. 1, 2009

(30) Foreign Application Priority Data

Mar. 27, 2008 (JP) ................................ 2008-082952

(51) Int. Cl.
*G09G 3/36* (2006.01)

(52) U.S. Cl.
USPC ................. 345/99; 345/92; 345/98; 345/100; 345/204; 348/518; 348/524; 348/537

(58) Field of Classification Search
USPC .................... 345/204, 173–175, 92, 98–100; 708/250–256; 348/518, 524, 537
See application file for complete search history.

(56) References Cited

U.S. PATENT DOCUMENTS

| | | | | |
|---|---|---|---|---|
| 4,625,290 A | * | 11/1986 | White | 345/419 |
| 5,268,949 A | * | 12/1993 | Watanabe et al. | 377/33 |
| 6,680,722 B1 | * | 1/2004 | Hiraki et al. | 345/96 |
| 2002/0080107 A1 | * | 6/2002 | Fujimoto et al. | 345/87 |
| 2004/0227714 A1 | * | 11/2004 | Furuichi | 345/98 |
| 2005/0093806 A1 | * | 5/2005 | Hosotani | 345/96 |
| 2005/0256986 A1 | * | 11/2005 | Kim et al. | 710/110 |
| 2007/0046650 A1 | * | 3/2007 | Lee et al. | 345/173 |

FOREIGN PATENT DOCUMENTS

JP 06-051957 2/1994

* cited by examiner

*Primary Examiner* — Lun-Yi Lao
*Assistant Examiner* — Md Saiful A Siddiqui
(74) *Attorney, Agent, or Firm* — Stites & Harbison PLLC; Juan Carlos A. Marquez, Esq.; Nicholas B. Trenkle, Esq.

(57) ABSTRACT

A display device includes a display panel, a control circuit and a random number generating circuit. The random number generating circuit includes a plurality of shift registers, an output circuit, and registers which holds initial values. By providing a plurality of initial values, the randomness of random numbers can be enhanced. Further, the random numbers different from each other can be outputted from the plurality of shift registers and hence, it is possible to increase the frequency and to output the increased frequency by an output circuit. Further, by adding a noise control signal which suppresses the number of inversion of a digital signal, electromagnetic wave noises generated from a liquid crystal display device can be reduced. Further, by adopting an intermittent drive clock which intermittently repeats stopping thereof as a basic clock of the plurality of shift registers, electromagnetic wave noises generated from the display device can be reduced. The basic clock may be a clock which is in synchronism with a transmission clock of the display data or a clock which is in asynchronism with a transmission clock of the display data.

14 Claims, 19 Drawing Sheets

D1　D2　D3　D4

D5　D6　D7　D8

D1　D3　D5　D7
　D2　D4　D6　D8

DISPLAY DEVICE

BACKGROUND OF THE INVENTION

1. Field of the Invention

The present invention relates to a display device, and more particularly to a technique which is effectively applicable to a random number generating circuit used in a display device.

2. Description of the Related Art

A TFT (thin film transistor)-type liquid crystal display device having a middle-size liquid crystal display panel has been popularly used as a display part of a personal digital assistant, a notebook-type personal computer or the like.

With respect to this middle-size liquid crystal display device, there has been known a liquid crystal display device which is provided with a touch panel arranged adjacent to the liquid crystal display device as an input device for receiving data inputted from the outside. Further, a keyboard has been also used as an external input device conventionally.

Data inputted from such an input device may be provided with coding such as encryption for securing secrecy. Random numbers are generally used for coding and hence, a display device is also required to include a random number generating circuit.

However, a conventional display device is not provided with a random number generating circuit, and attempts have been made to find out an optimum random number generating device for a general-use display device.

On the other hand, conventionally, there have been proposed various random number generating circuits. JP-A-06-051957 discloses a circuit which generates random numbers referred to as M series by a shift register. However, JP-A-06-051957 neither discloses nor suggests a random number generating circuit used by a display device.

SUMMARY OF THE INVENTION

When a random number generating circuit having high randomness is used in the above-mentioned display device, there arises a drawback that a circuit scale is increased and hence, it is difficult to prevent the elevation of a material cost or to ensure a region where the random number generating circuit is mounted.

Further, a display device is also required to satisfy a demand that a voltage change of a signal outputted from a circuit is suppressed to cope with electromagnetic wave noises (EMI).

The generation of random numbers by the random number generating circuit has a characteristic that randomness is high and hence, there also arises a drawback that a voltage change occurs frequently thus increasing electromagnetic wave noises.

The present invention has been made to overcome the above-mentioned drawbacks, and it is an object of the present invention to provide a technique which can suppress a circuit scale and, at the same time, can cope with electromagnetic wave noises while using an optimum random number generating circuit in a display device.

The above-mentioned and other objects and novel features of the present invention will become apparent from the description of this specification and attached drawings.

To simply explain the summary of typical inventions among inventions disclosed in this specification, they are as follows.

According to one aspect of the present invention, there is provided a display device which includes a display panel, a drive circuit which drives respective pixels of the display panel, and a control circuit which outputs display data to the drive circuit, wherein the control circuit includes a random number generating circuit. The random number generating circuit includes n pieces of shift registers, and a basic clock for the shift registers is outputted from the control circuit as an intermittent drive clock which intermittently repeats stopping thereof. Output signals of n pieces of shift registers are inputted to an output circuit. The output circuit generates an output signal having a frequency n times as large as a frequency of the output signals of n pieces of shift registers from these shift registers. The basic clock of the shift registers may be a clock which is in synchronism with a transmission clock of the display data or may be a clock which is in asynchronism with the transmission clock of the display data. Further, to transmit a digital signal, an inversion control signal which inverts the digital signal based on the number of changes of a signal voltage may be used.

To simply explain advantageous effects acquired by the typical inventions among the inventions disclosed in this specification, they are as follows.

According to the present invention, by providing n pieces of shift registers, the randomness of the random numbers generated by the random number generating circuit is enhanced. Further, with the use of n pieces of shift registers, it is possible to generate the signal having the frequency n times as large as the frequency of the output signal of the shift registers as the random numbers.

By adopting the intermittent drive clock which intermittently repeats stopping thereof as the basic clock of the shift register, the generation of the random number can be stopped intermittently thus suppressing the generation of electromagnetic wave noises attributed to the generation of random numbers.

By allowing the transmission of the digital signal to use the inversion control signal which inverts the digital signal based on the number of changes of the signal voltage, it is possible to suppress the generation of electromagnetic wave noises by suppressing the change of the signal voltage.

DETAILED DESCRIPTION OF THE EMBODIMENT

Hereinafter, embodiments of the present invention are explained in detail in conjunction with drawings.

Here, in all drawings for explaining the embodiments, parts having identical functions are given same numerals and their repeated explanation is omitted.

Figure 1:
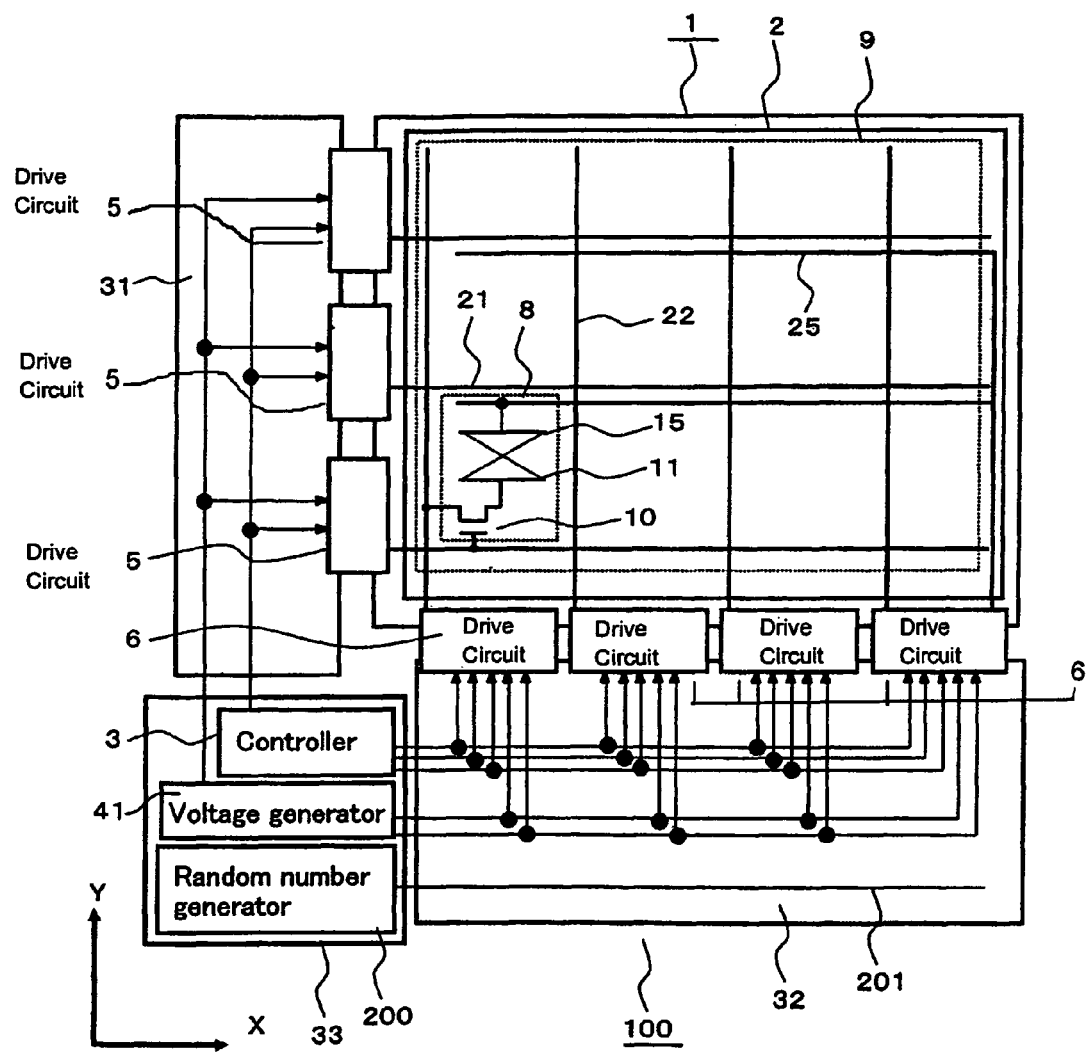
FIG. 1 is a block diagram showing the schematic constitution of a liquid crystal display device of an embodiment according to the present invention.

FIG. 1 is a block diagram showing the schematic constitution of a liquid crystal display device of the embodiment according to the present invention. As shown in FIG. 1, the liquid crystal display device is constituted of a liquid crystal display panel 1, a scanning-signal-line-side printed circuit board 31, a video-signal-line-side printed circuit board 32 and a control circuit board 33.

The liquid crystal display panel 1 is configured as follows. A TFT substrate 2 on which a plurality of thin film transistors 10, a plurality of pixel electrodes 11, a plurality of counter electrodes 15 and the like are formed and a filter substrate (not shown in the drawing) on which a plurality of color filters and the like are formed so as to overlap with each other with a predetermined gap therebetween. Both substrates are adhered to each other using a frame-shaped sealing material (not shown in the drawing) arranged between both substrates and in the vicinity of peripheral portions of both substrates and, at the same time, liquid crystal composition is filled and sealed in a space defined by both substrates and the sealing material. Further, a polarizer is adhered to outer surfaces of both substrates.

Here, the embodiment of the present invention is applicable to both of a so-called IPS-method type liquid crystal display panel in which the counter electrodes 15 are arranged on the TFT substrate 2 and a so-called vertical-electric-field method type liquid crystal display panel in which the counter electrodes 15 are arranged on the filter substrate in the same manner.

In FIG. 1, scanning signal lines (also referred to as gate signal lines) 21 which extend in the x direction and are arranged parallel to each other in the y direction in the drawing, and video signal lines (also referred to as drain signal lines) 22 which extend in the y direction and are arranged parallel to each other in the x direction in the drawing are arranged on the TFT substrate 2, and a pixel portion 8 is formed in a region surrounded by the scanning signal lines 21 and the drain signal lines 22.

Here, although the liquid crystal display panel 1 includes a large number of pixel portions 8 in a matrix array, for facilitating the understanding of the drawing, only one pixel portion 8 is shown in FIG. 1. The pixel portions 8 arranged in a matrix array form a display region 9, the respective pixel portions 8 play a role of pixels of a display image, and an image is displayed in the display region 9.

The thin film transistor 10 of each pixel portion 8 has a source thereof connected to the pixel electrode 11, has a drain thereof connected to the video signal line 22, and has a gate thereof connected to the scanning signal line 21. The thin film transistor 10 functions as a switch for supplying a display voltage (gray scale voltage) to the pixel electrode 11. Here, although naming of "source" and "drain" may be reversed based on the relationship of biases, in this embodiment, the electrode which is connected to the video signal line 22 is referred to as the drain.

The video signal lines 22 are connected with drive circuits 6, and video signals are supplied from the drive circuits 6. Further, in FIG. 1, numeral 25 indicates a counter electrode (common electrode), and a common voltage is supplied to the counter electrode 25 from the drive circuit 6 in FIG. 1. The scanning signal lines 21 are connected to the drive circuits 5, and scanning signals are supplied from the drive circuits 5.

The drive circuits 5 are connected with a scanning-signal-line-side printed circuit board 31, control signals are supplied to the drive circuits 5 from the control circuit 3 via the scanning-signal-line-side printed circuit board 31, and a power source voltage is supplied from a power source circuit 41. The drive circuits 6 are connected with the video-signal-line-side printed circuit board 32, and control signals are supplied to the drive circuits 6 from the control circuit 3 via the video-signal-line-side printed circuit board 32, and a power source voltage is supplied from a power source circuit 41.

The control circuit 3 and the power source circuit 41 are mounted on the control printed circuit board 33. A random number generating circuit 200 is mounted on the control printed circuit board 33, and the random numbers are generated from the random number generating circuit 200. A transmission line 201 is connected to the random number generating circuit 200 so as to allow the transmission of signals from the random number generating circuit 200 to the video-signal-line-side printed circuit board 32 and the like through the transmission line 201. The detail of the random number generating circuit 200 is described later.

Further, a display data line 46 and a display data transmission clock line 50 extend to the video-signal-line-side printed circuit board 32 from the control circuit 3, and the display data line 46 and the display data transmission clock line 50 are connected to the drive circuits 6, and display data is supplied to the drive circuits 6 in synchronism with a display data transmission clock via the display data lines 46.

Further, the display data transmission clock or a basic clock generated by the control circuit 3 is supplied to the random number generating circuit 200 from the control circuit 3. The detail of the basic clock is described later.

An inversion control signal line 203 also extends from the control circuit 3, and transmits an inversion control signal indicative of whether or not the display data is inverted to the respective drive circuits 6. The detail of the inversion control signal will be also described later.

Figure 2:
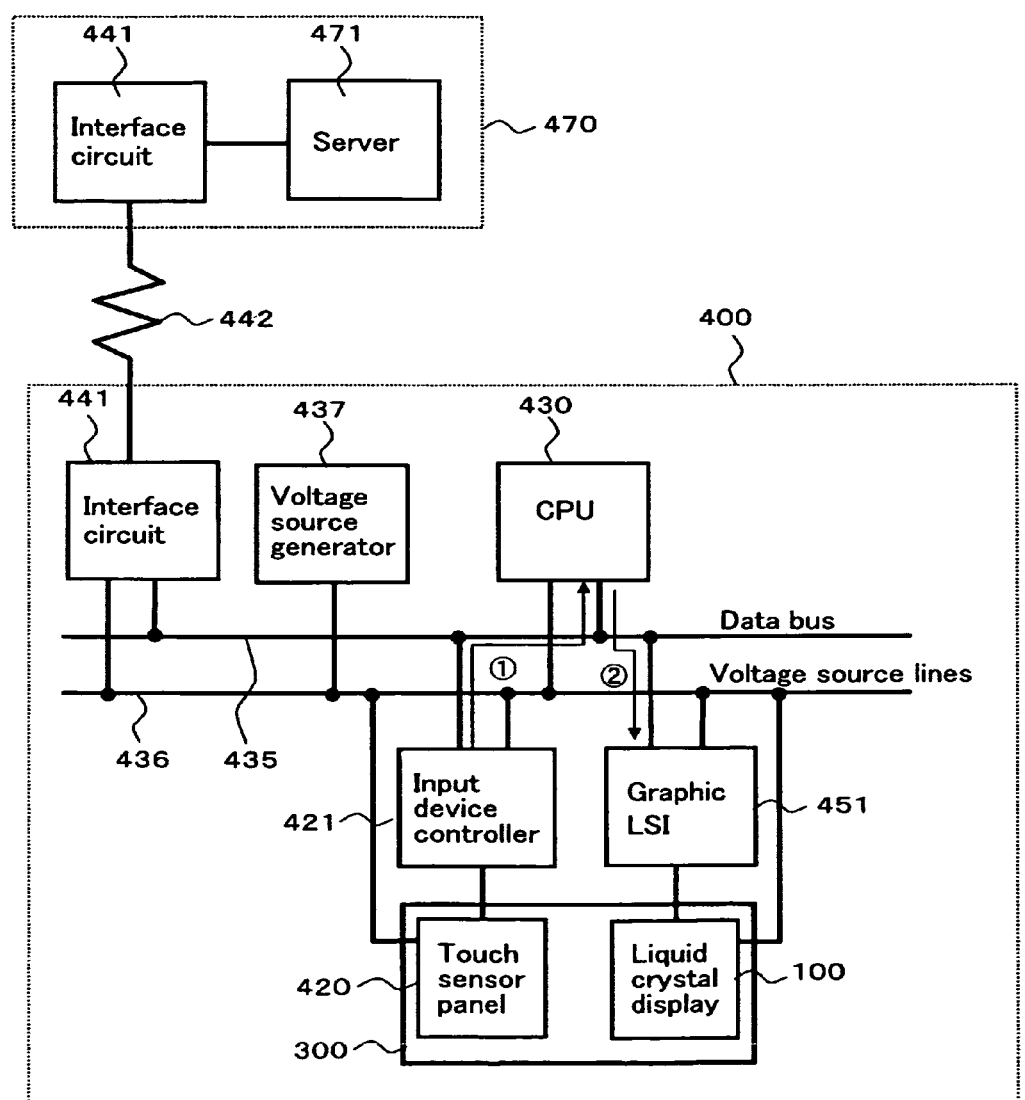
FIG. 2 is a block diagram showing the schematic constitution of a terminal device to which the liquid crystal display device of the embodiment according to the present invention is applied.

Next, a terminal device 400 to which a liquid crystal display device 100 is applied is explained in conjunction with FIG. 2. The liquid crystal display device 100 is used as a display part of the terminal device 400. A touch sensor panel 420 is arranged adjacent to the liquid crystal display device 100, and the liquid crystal display device 100 and the touch sensor panel 420 form a display/input part 300.

Figure 3:
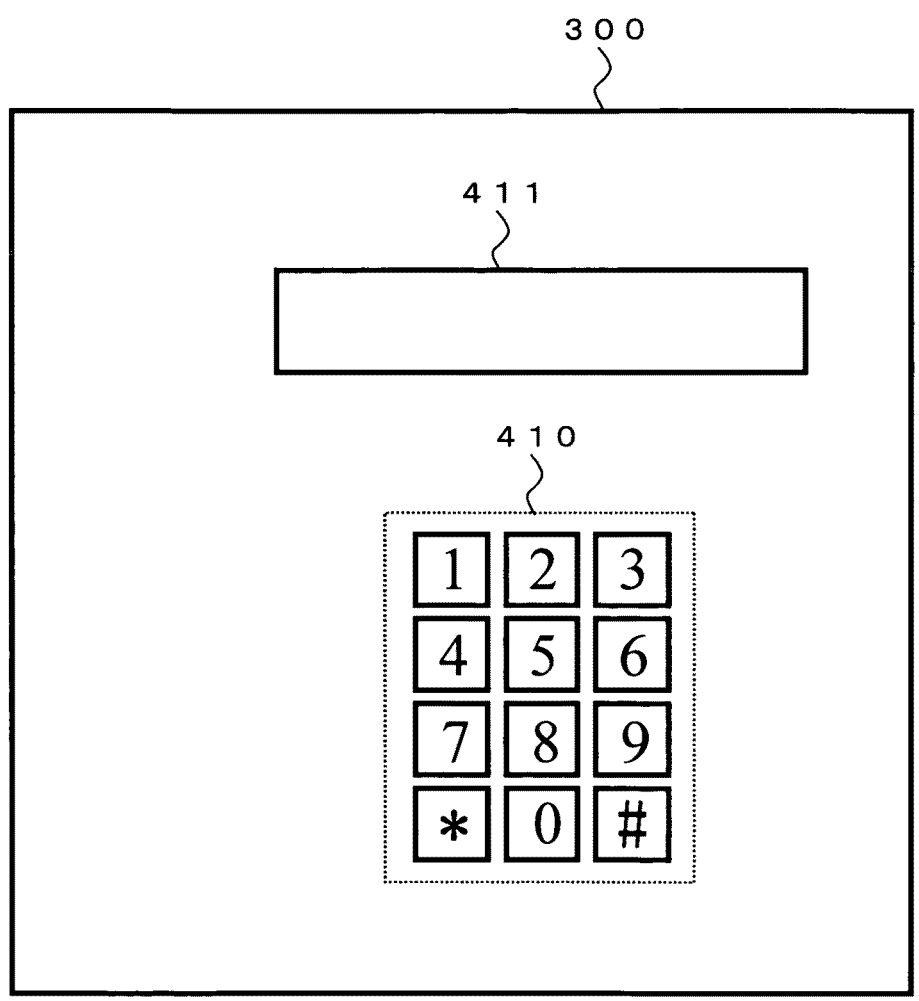
FIG. 3 is a front view showing a schematic profile of a display/input part of the terminal device to which the liquid crystal display device of the embodiment according to the present invention is applied.

FIG. 3 is a schematic front view of the display/input part 300. The display/input part 300 shows a touch input part 410 to a user of the terminal device 400, and displays inputted information on a display part 411.

The user touches the touch input part 410 with his/her finger or the like so as to input data based on information displayed at a contact position to the terminal device 400. The inputted data is processed by the terminal device 400 and is also displayed on the display part 411 for confirmation.

In case of data having high secrecy, processing such as encryption is applied to the inputted data. Further, actual data is not displayed on the display part 411 and, for example, asterisk or the like is displayed.

Returning to FIG. 2, the flow of data processing is explained. Position data inputted from the touch censor panel 420 is firstly transmitted to an input device control circuit 421 where the position data is subject to data processing. Then, the position data is transmitted to a CPU 430 via a data bus 435.

In CPU 430, processing necessary for the input data is selected and executed. With respect to the liquid crystal display device 100, a display content is selected based on the input data, and the display content is transmitted to an image integrating circuit 451 via the data bus 435.

Processing necessary for an image display is performed in the image integrating circuit 451, and display data is outputted to the liquid crystal display device 100. Here, when encryption or the like is applied to the display data, a random number generating circuit 200 becomes necessary also on a liquid-crystal-display-device-100 side.

The terminal device 400 particularly includes an external communication circuit 441. Due to the transaction of data with a central processing device 470 at a remote site by making use of a communication line 442 such as a LAN, the terminal device 400 requires encryption or the like as inevitable processing. The central processing device 470 is constituted of the external communication circuit 441 and a server 471, for example. Here, numeral 437 indicates a power source circuit of the terminal device 400, and numeral 436 indicates a power source line.

Next, the display/input part 300 is explained in conjunction with FIG. 3. The display/input part 300 is configured such that the liquid crystal display device 100 and the touch sensor panel 420 overlap with each other on a plane. FIG. 3 shows the display/input part 300 as viewed from a user, and a distinct boundary between the liquid crystal display device 100 and the touch sensor panel 420 is not shown.

The display/input part 300 displays the touch input part 410 for allowing the user to input data using the liquid crystal display device 100. The user can input data by touching the touch input part 410 with his/her finger or the like. The touch sensor panel 420 transmits the position information acquired by touching of the user on the touch sensor panel 420 to the terminal device 400 via the input device control circuit 421.

The terminal device 400 determines the input data based on the position information from the touch sensor panel 420. That is, in the display/input part 300, the position information has the significant meaning and a display image also includes a function of an input device. Here, when the user touches the touch input part 410, there may be a case that a display in a region which indicates the input data is changed to allow the confirmation of an input operation. For example, when the user touches the inside of a square which surrounds the number 2 of the touch input part 410, a display of the inside of the square which surrounds the number 2 is inverted or background color is changed.

Figure 4:
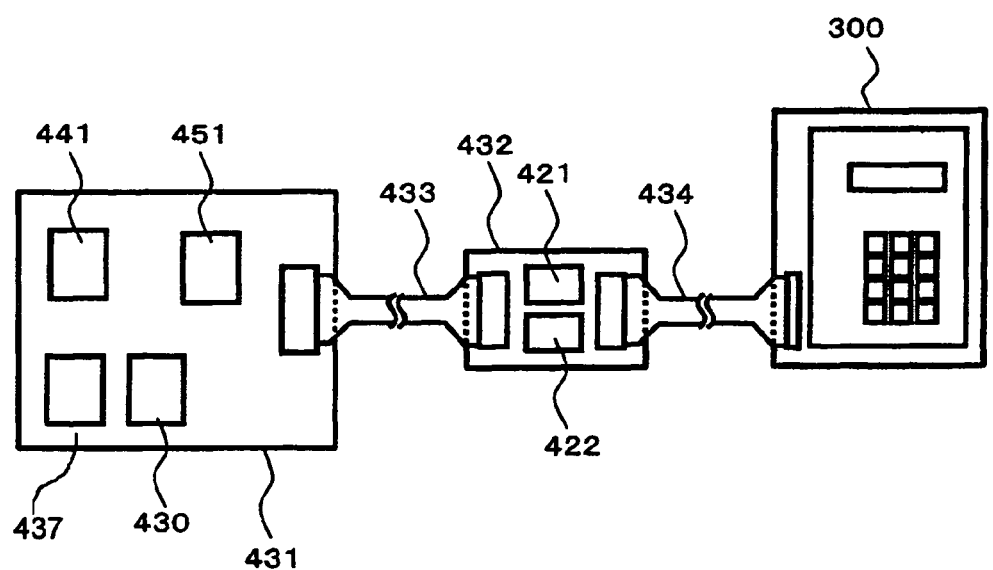
FIG. 4 is a block diagram showing the schematic mounting constitution of the terminal device to which the liquid crystal display device of the embodiment according to the present invention is applied.
Figure 5:
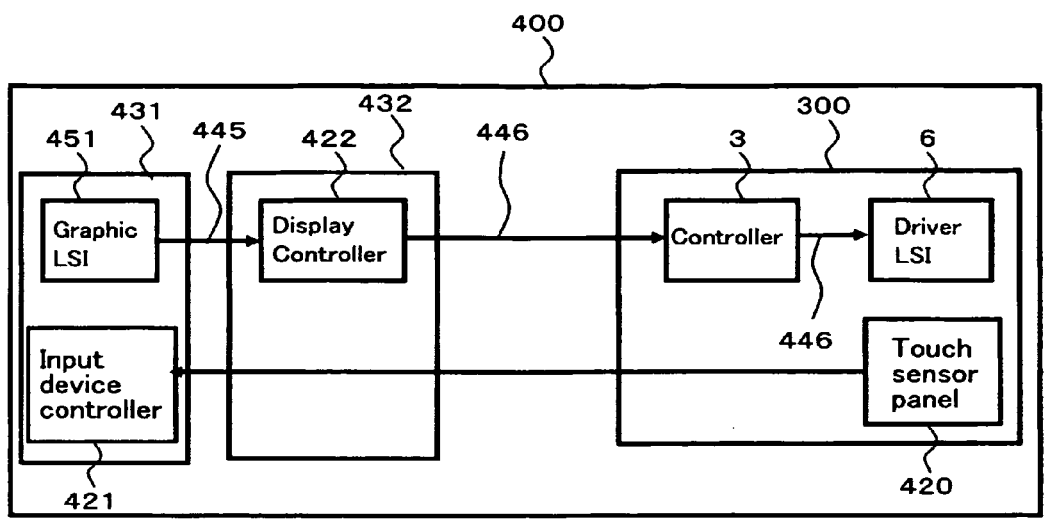
FIG. 5 is a block diagram showing a transmission path of a signal of the terminal device to which the liquid crystal display device of the embodiment according to the present invention is applied.

Next, FIG. 4 shows a mounting mode of the display/input part 300. The display/input part 300 is mounted apart from a main substrate 431 of the terminal device 400 so as to allow a user to face the display/input part 300. Further, the display/input part 300 may be also mounted such that an input/output substrate 432 is provided separate from the display/input part 300 and the main substrate 431 and the input/output substrate 432 are connected with each other by a cable 433, and the input/output substrate 432 and the display/input part 300 are connected with each other by a cable 434.

The input device control circuit 421 and the display control device 422 are mounted on the input/output substrate 432. The display control device 422 is provided for imparting the general-use property to the liquid crystal display device 100. For example, the liquid crystal display device 100 is compatible to not only analog signal inputting but also digital signal inputting due to the display control device 422.

Further, digital signals differ from each other in accordance with standards and hence, the display control device 422 performs processing for transmitting the display data which the image integrating circuit 451 outputs to the control circuit 3 of the liquid crystal display device 100. Further, the display control device 422 may also output a low-voltage differential signal or the like for the liquid crystal display device 100.

Signals which are transmitted between the main substrate 431 and the display/input part 300 are explained in conjunction with FIG. 5 to FIG. 8. Although the transmission of data is performed via the data bus 435 in the main substrate 431, a signal 445 which conforms to a display data standard is outputted to the display control device 422 from the image integrating circuit 451.

The signal 445 outputted from the image integrating circuit 451 is, in general, a digital signal which oscillates at 3V to 5V and also is a parallel signal of 8 to 32 bits. Accordingly, there may arise a drawback that noises are generated by the signal 445 and hence, it is necessary to design wiring of the signal with care.

Next, a digital signal 446 is outputted to the control circuit 3 of the liquid crystal display device 100 from the display control device 422. The digital signal 446 is also a parallel signal of 8 to 64 bits which oscillates at 3V to 5V. Accordingly, there may arise a drawback that noises are generated by the signal 446 and hence, it is necessary to design wiring of the signal with care.

Further, the digital signal 446 is also outputted to the drive circuit 6 from the control circuit 3. The digital signal 446 which is outputted to the drive circuit 6 from the control circuit 3 is transmitted via the display data line 46 which is formed on the video-signal-line-side printed circuit board 32 as shown in FIG. 1.

Figure 6:
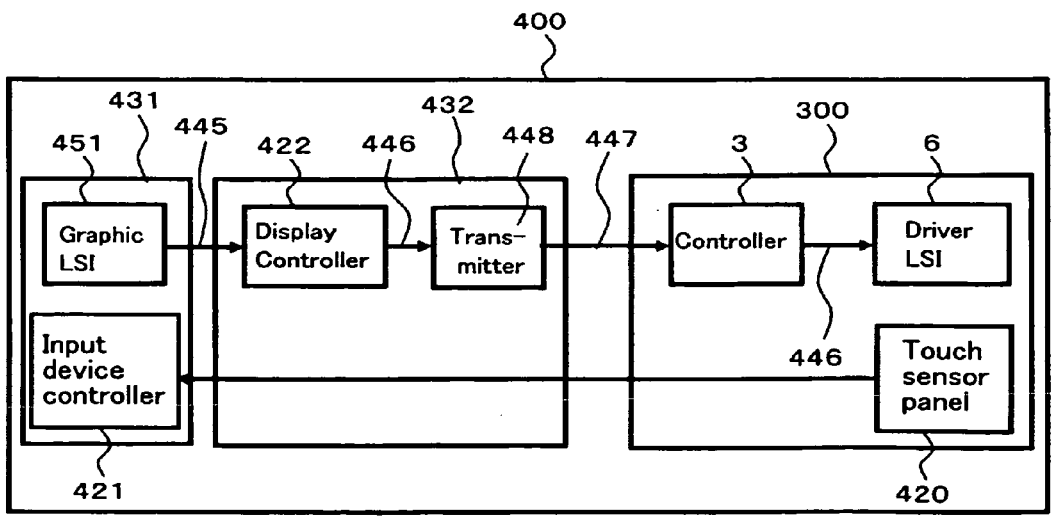
FIG. 6 is a block diagram showing a transmission path of a signal of the terminal device to which the liquid crystal display device of the embodiment according to the present invention is applied.

FIG. 6 shows a case in which a low-voltage differential signal 447 is outputted from the input/output substrate 432. An output from the display control device 422 is converted into the low-voltage differential signal 447 by a transmitter 448. The low-voltage differential signal 447 is effective to cope with the EMI and hence, noises generated by the low-voltage differential signal 447 are smaller than noises generated by the digital signal 446 or the like. However, depending on a case, it is necessary to take a countermeasure against noises generated by the low-voltage differential signal 447.

Also in the case shown in FIG. 6, the digital signal 446 is transmitted to the transmitter 448 from the display control device 422 and hence, it is necessary to take a countermeasure against noises between the display control device 422 and the transmitter 448.

Figure 7:
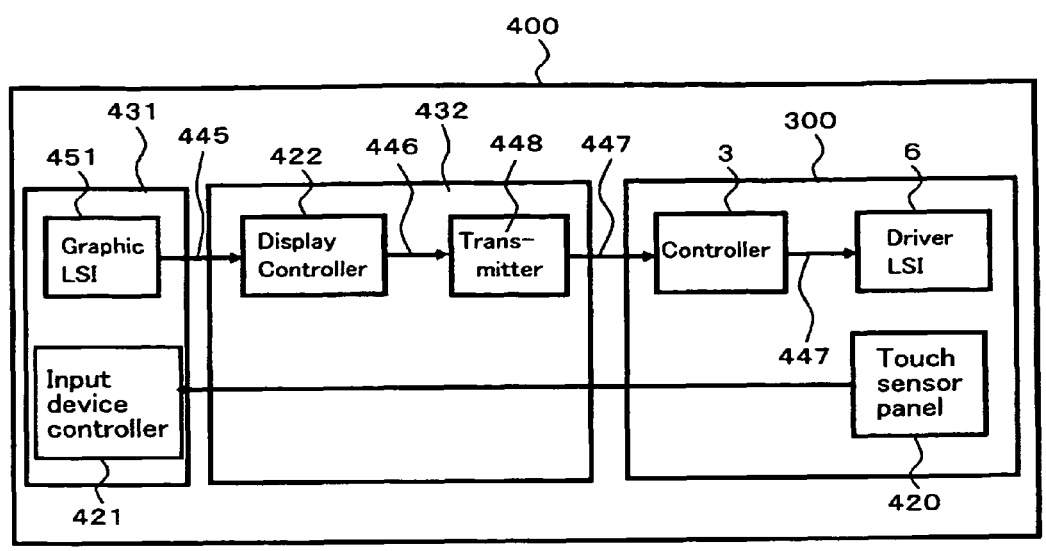
FIG. 7 is a block diagram showing a transmission path of a signal of the terminal device to which the liquid crystal display device of the embodiment according to the present invention is applied.

Next, FIG. 7 shows a case in which the low-voltage differential signal 447 is outputted from the input/output substrate 432, and the low-voltage differential signal 447 is also outputted from the control circuit 3. By outputting the low-voltage differential signal 447 from the control circuit 3, it is possible to effectively take a counter measure against the EMI on the video-signal-line-side printed circuit board 32 or the scanning-signal-line-side printed circuit board 31.

The signal processing is performed using the digital signal in the control circuit 3 and hence, the low-voltage differential signal 447 is once converted into the digital signal in the control circuit 3 and, at the time of being outputted from the control circuit 3, the digital signal is converted into a low-voltage differential signal 447 for the video-signal-line-side printed circuit board 32 and the scanning-signal-line-side printed circuit board 31.

Figure 8:
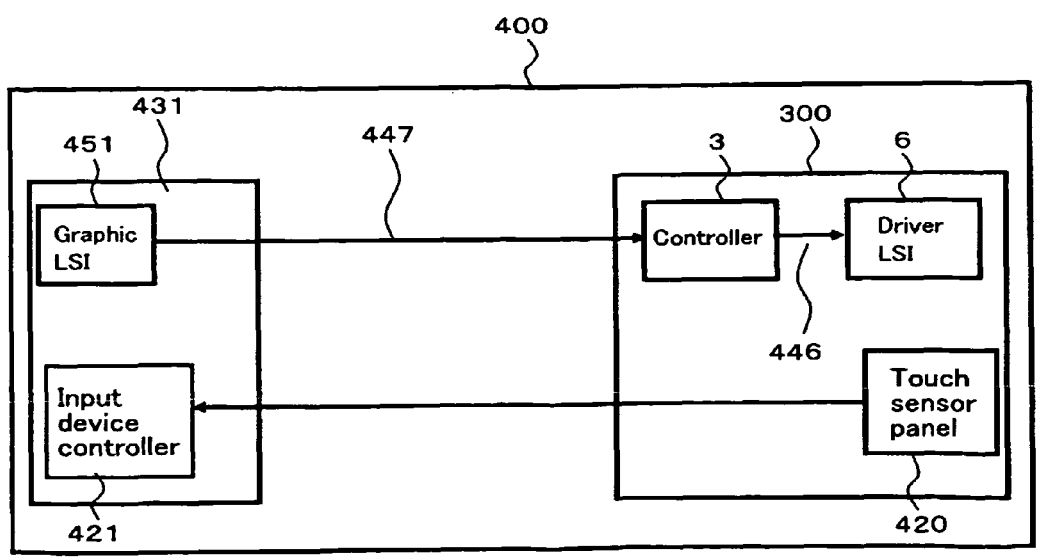
FIG. 8 is a block diagram showing a transmission path of a signal of the terminal device to which the liquid crystal display device of the embodiment according to the present invention is applied.

FIG. 8 shows a case in which the image integrating circuit 451 has a function of the display control device 422. In FIG. 8, the low-voltage differential signal 447 is directly outputted to the control circuit 3 from the image integrating circuit 451. In this case, the generation of noises is suppressed between the image integrating circuit 451 and the control circuit 3. However, when the digital signal 446 is outputted to the drive circuit 6 or the drive circuit 5 from the control circuit 3, it is necessary to take a countermeasure against noises generated in a path which follows the control circuit 3.

Figure 9:
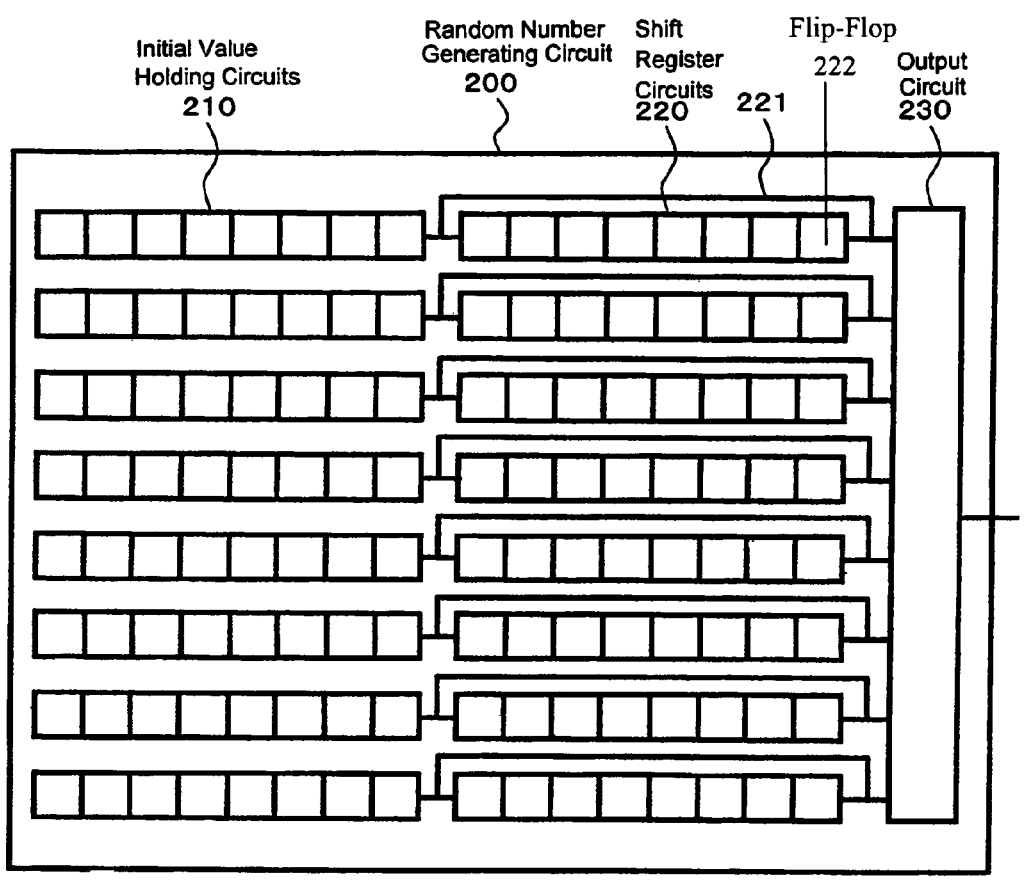
FIG. 9 is a block diagram showing a random number generating circuit used in the liquid crystal display device of the embodiment according to the present invention.

Next, the random number generating circuit 200 is explained in conjunction with FIG. 9. Numeral 210 indicates a register which holds an initial value, numeral 220 indicates a shift register, and numeral 230 indicates an output circuit. The shift register 220 is constituted of plural stages of flip-flops 222.

Further, the shift register 220 generates random numbers by returning a value of the final-stage flip-flop 222 to a value of the initial-stage flip-flop 222 by a feedback path 221. The shift register 220, as described later, takes out a value from the flip-flop 222 of a middle stage, and takes out an exclusive OR of the value of the middle-stage flip-flop 222 and a value of the feedback path 221, and returns a calculation result to the initial-stage flip-flop 222 thus generating the random number.

Although the shift register 220 may generate the random number in a single form, in FIG. 9, eight shift registers 220-1 to 220-8 are provided in parallel to each other, outputs of the respective shift registers 220 are inputted to the output circuit 230, and the random number is outputted from the output circuit 230.

Further, for setting different initial values to eight respective shift registers 220-1 to 220-8, eight registers 210 are prepared, and the different initial values are stored in the respective registers 210. By allowing the respective shift registers 220 to read the different initial values from the registers 210 at the time of starting operations of the respective shift registers 220, it is possible to generate random numbers of different patterns.

Further, to enhance the randomness of the random numbers to be generated, the frequency of the basic clock may differ among the respective shift registers 220-1 to 220-8.

Further, in the respective shift registers 220-1 to 220-8, an output stage of the flip-flop 222 which inputs a value thereof to an exclusive-OR circuit 223 may be changed thus forming a different feedback path 221 whereby the randomness of the random number which the random number generating circuit 200 generate may be enhanced.

Further, the randomness of the random number may be also enhanced by changing the number of stages of the flip-flop 222 in the respective shift registers 220-1 to 220-8. Further, as described later, to reduce electromagnetic wave noises attributed to the generation of the random number, as the basic clocks to be inputted to the respective shift registers 220-1 to 220-8, intermittent drive clocks which repeat intermittent stopping thereof may be also used.

Figure 10:
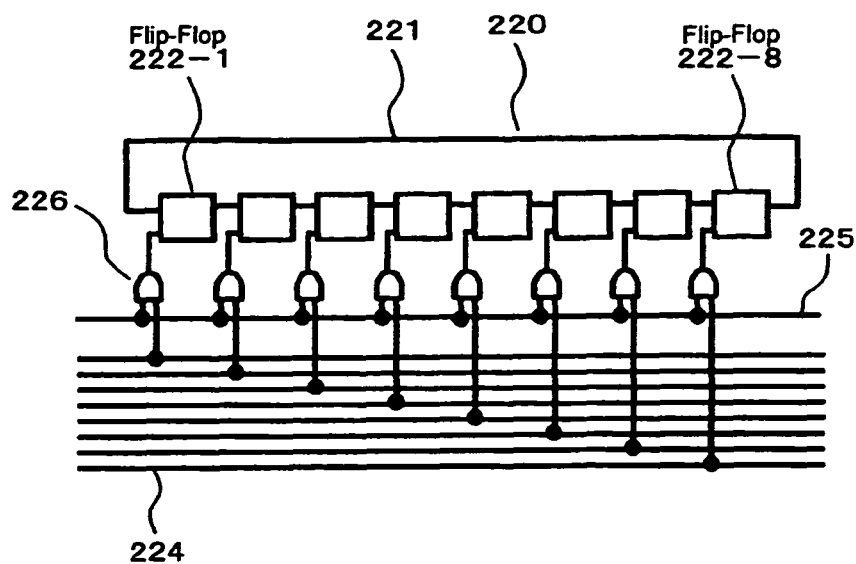
FIG. 10 is a schematic circuit diagram showing the random number generating circuit used in the liquid crystal display device of the embodiment according to the present invention.

Next, FIG. 10 shows a transmission method of the initial value. The initial value transmitted by an initial value transmission line 224 is stored in each flip-flop 222 via an AND circuit 226 when an initial value transmission control signal line 225 assumes a high level. In FIG. 10, the flip-flop 222-1 constitutes an initial-stage flip-flop, and the flip-flop 222-8 constitutes a final-stage flip-flop.

Figure 11:
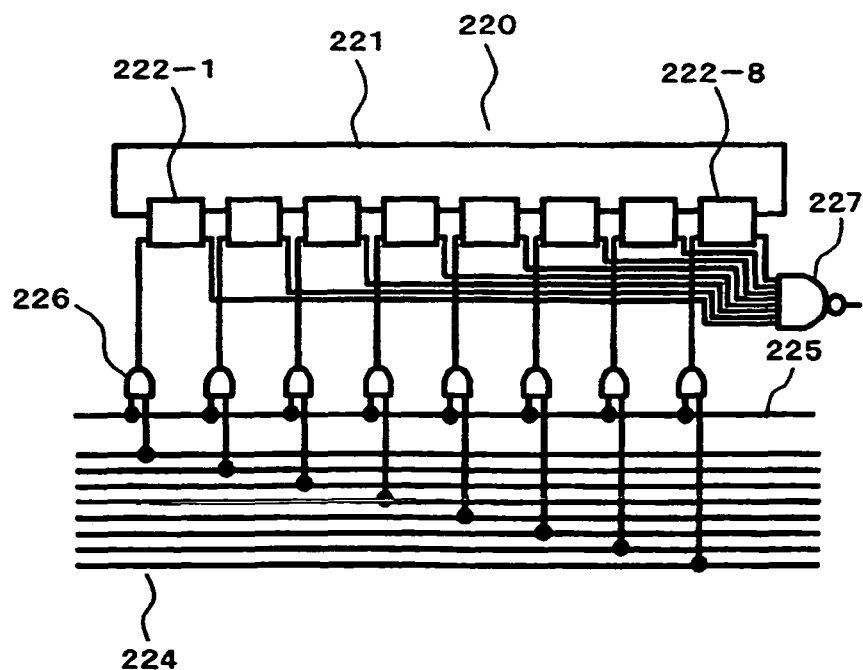
FIG. 11 is a schematic circuit diagram showing the random number generating circuit used in the liquid crystal display device of the embodiment according to the present invention.

FIG. 11 shows a transmission method of the initial value in which a determination circuit 227 is added. The shift register 220 cannot generate the random number when the initial values of all flip-flops 222 are set to 0 and hence, it is determined whether or not the initial values of all flip-flops 222 are set to 0 using the determination circuit 227.

Figure 12A:
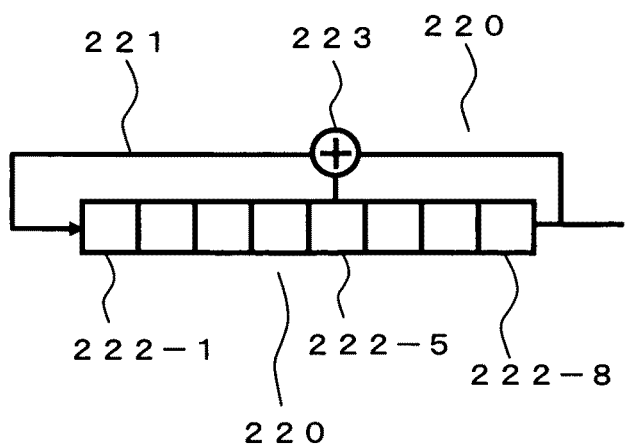
FIG. 12A and FIG. 12B are schematic circuit diagrams showing the random number generating circuit used in the liquid crystal display device of the embodiment according to the present invention.
Figure 12B:
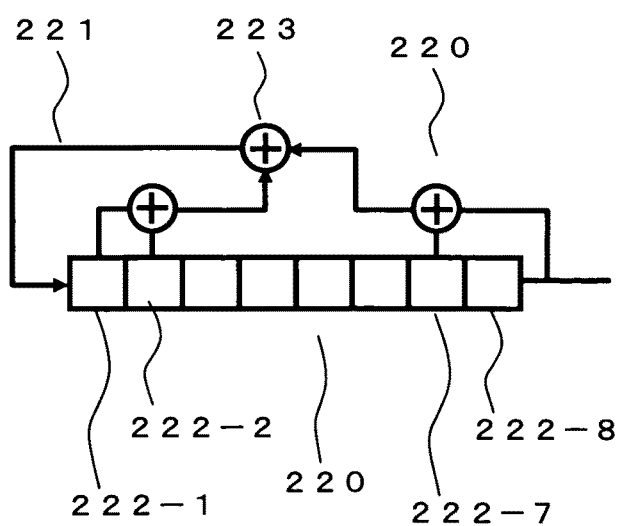

Next, the feedback path 221 of the shift register 220 is explained in conjunction with FIG. 12A and FIG. 12B. In FIG. 12A, an output of the final-stage flip-flop 222-8 and an output of the fifth-stage flip-flop 222-5 are calculated by an exclusive-OR circuit 223, and a result of the calculation is inputted to the initial-stage flip-flop circuit 222-1 thus generating the random number.

Figure 13A:
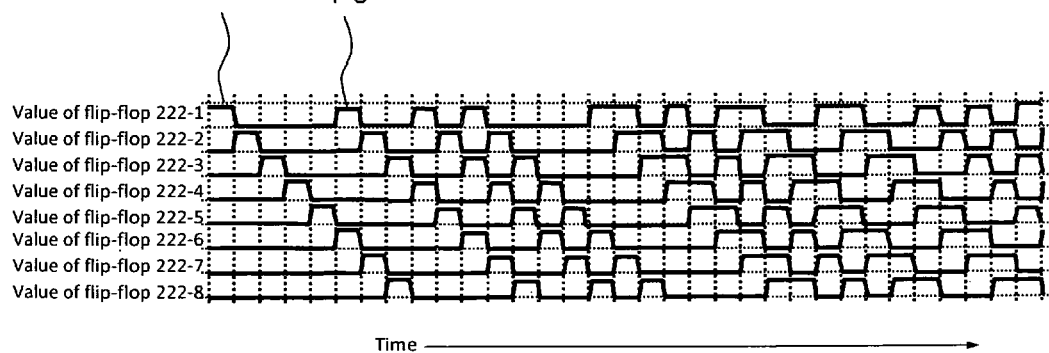
FIG. 13A and FIG. 13B are timing charts showing an output waveform of the random number generating circuit used in the liquid crystal display device of the embodiment according to the present invention.

FIG. 13A shows a pattern which the random numbers generate when the initial values (1, 0, 0, 0, 0, 0, 0, 0) are set. The value "1" is held in the initial-stage flip-flop 222-1 during a period T1, and the value "1" held in the flip-flop 222-1 is transmitted to the next-stage flip-flop in synchronism with the basic clock.

When the value "1" is held in the fifth-stage flip-flop 222-5, an exclusive OR is calculated between the value "1" held by the fifth-stage flip-flop 222-5 and the value "0" held by the final-stage flip-flop 222-8, a result of the calculation "1" is held in the initial-stage flip-flop 222-1, and values (1, 0, 0, 0, 0, 1, 0, 0) are held in the shift register 220 in a period T6. Hereinafter, other remaining values are transmitted between the flip-flops 222 in synchronism with the basic clock in the same manner as the above.

By forming the random number generating circuit 200 using n-stages of shift registers 220 as described above, it is possible to generate random numbers referred to as M series at a cycle of (n powers of 2-1).

FIG. 12B shows the shift register 220 which acquires a calculation result of exclusive OR of the initial-stage flip-flop 222-1 and the second-stage flip-flop 222-2 and a calculation result of exclusive OR of the final-stage flip-flop 222-8 and the flip-flop 222-7 which comes one stage before the final-stage flip-flop 222-8 and, then, inputs a result acquired by calculating an exclusive OR of these calculation results to the initial stage. In this manner, by forming a feedback path 221 which differs from the random number generating circuit 200 which uses the n-stage shift registers 220, it is possible to provide the random number generating circuit 200 which generates a different pattern.

Figure 13B:
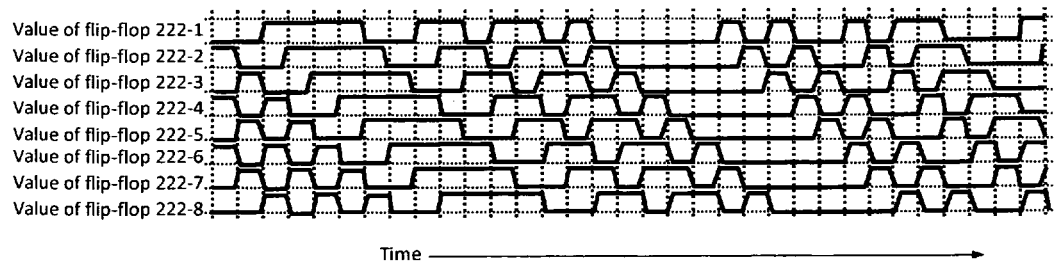

Next, the initial values are explained again in conjunction with FIG. 13A and FIG. 13B. FIG. 13A and FIG. 13B show patterns of random numbers which the same shift register 220 generates. FIG. 13A shows the pattern of random numbers with the initial values (1, 0, 0, 0, 0, 0, 0, 0), and FIG. 13B shows the pattern of random numbers with the initial values (0, 1, 0, 1, 0, 1, 0, 0).

As can be clearly understood from FIG. 13A and FIG. 13B, even when the same shift register 220 is adopted, the patterns of the random number differ from each other when the initial values are different. In the random number generating circuit 200 shown in FIG. 9, the random numbers are generated using the plurality of shift registers 220 in which the different initial values are set thus enhancing the randomness of the random numbers generated by the random number generating circuit 200.

Figure 14:
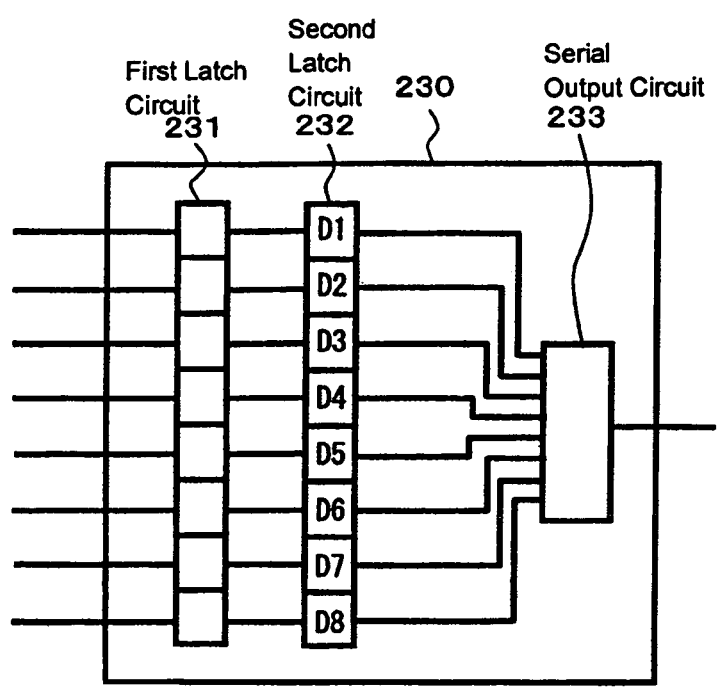
FIG. 14 is a schematic circuit diagram showing an output circuit of the random number generating circuit used in the liquid crystal display device of the embodiment according to the present invention.

Next, drawbacks which arise when the random number generating circuit 200 is formed using the plurality of shift registers 220 and a method of solving such drawbacks are explained in conjunction with FIG. 14 and FIG. 15.

In FIG. 14, an output of the shift register 220 is temporarily held by a first latch circuit 231. Thereafter, data is held in a second latch circuit 232, and the data is read from the second latch circuit 232 at a frequency 8 times as large as a frequency of the basic clock of the shift register 220, and the data is outputted from a serial output circuit 233 as serial signals.

Figure 15A:
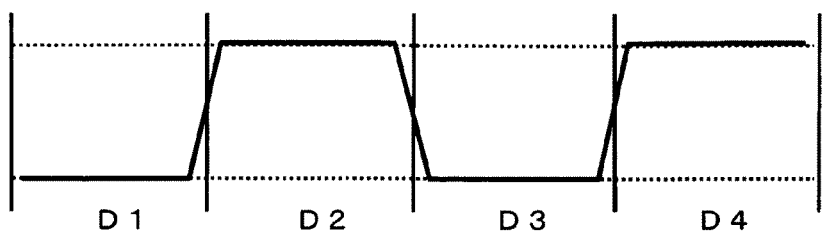
FIG. 15A to FIG. 15C are timing charts for explaining an output waveform of the output circuit of the random number generating circuit used in the liquid crystal display device of the embodiment according to the present invention.
Figure 15B:
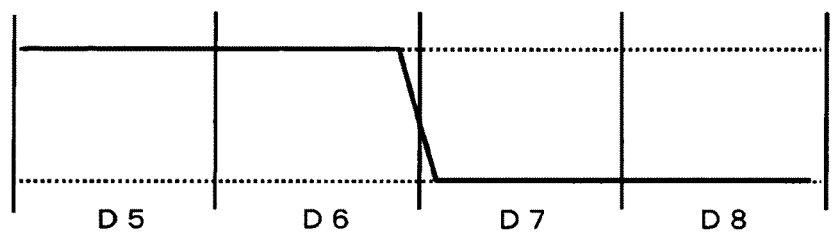
Figure 15C:
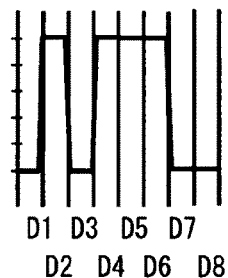

As shown in FIG. 15A and FIG. 15B, data D1 to D8 held in the second latch circuit 232 have frequency thereof increased 8 times as shown in FIG. 15C and the frequency-increased data is outputted from the serial output circuit 233.

Although the randomness is enhanced when the random numbers are generated using n pieces of shift registers 220, such an operation generates n pieces of different random numbers. In generating a plurality of random numbers, when the number of random numbers which exceeds the number of random numbers which are actually used, the random numbers which exceeds the number of actually used random numbers become wasteful.

Accordingly, by providing the output circuit 230 so as to output serial signals having n-times frequency, it is possible to make use of the outputted random numbers without a waste. Here, the output of the output circuit 230 is not limited to digital signals, and low-voltage differential signals or the like may be outputted. When the low-voltage differential signals are outputted from the output circuit 230, the transmission line 201 becomes a pair line. Further, the transmission line 201 may be formed of a loop-shaped line in place of the open-ended line shown in FIG. 1.

Figure 16:
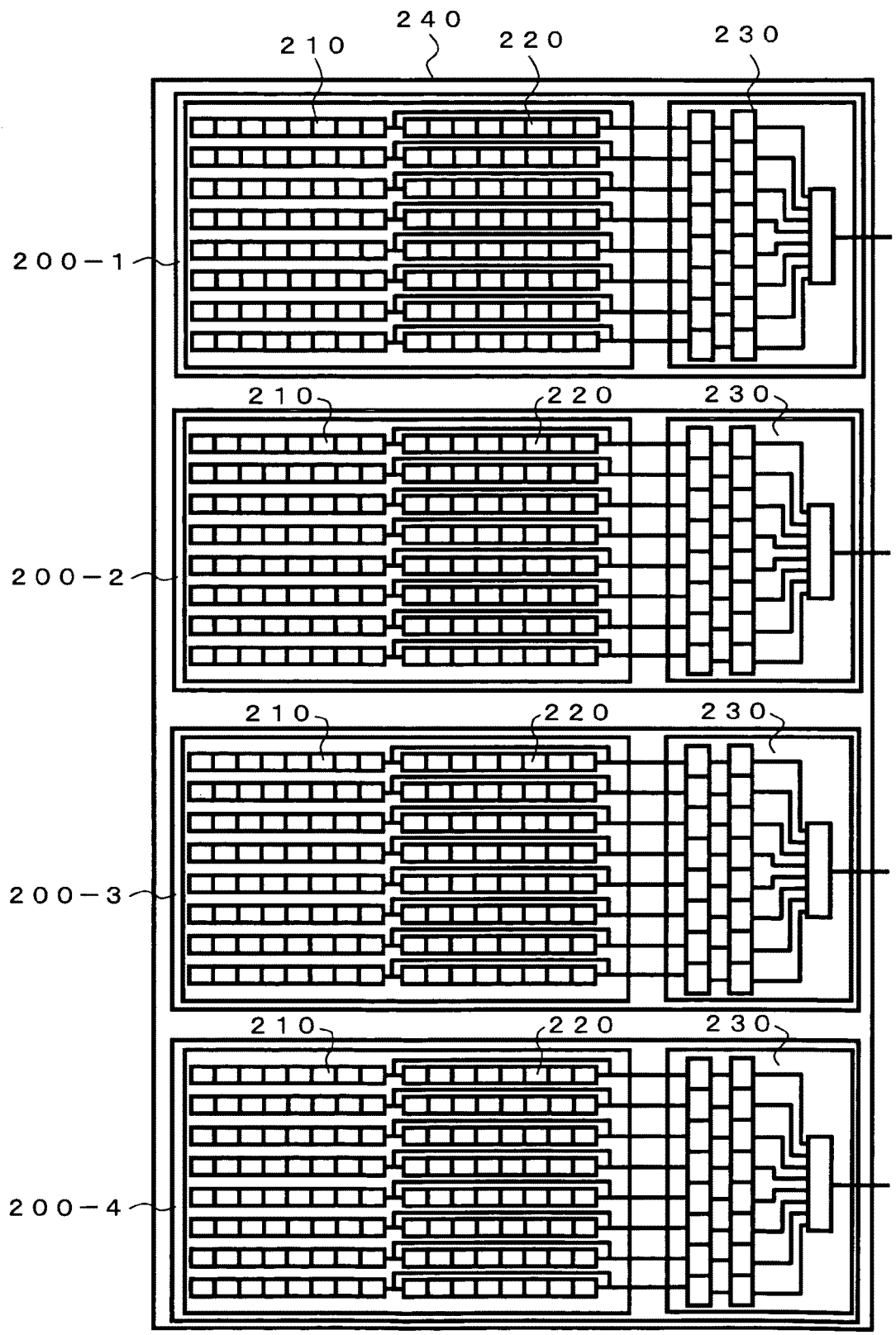
FIG. 16 is a schematic block diagram showing the random number generating circuit used in the liquid crystal display device of the embodiment according to the present invention.

Next, FIG. 16 shows a set of random number generating circuits 240 which is constituted by arranging 4 pieces of random number generating circuits 200 in parallel, wherein 8 pieces of shift registers 220 are inputted to one piece of output circuit 230. The set of random number generating circuits 240 shown in FIG. 16 can enhance randomness of random numbers thus enabling the further increase of number of the plurality of acquirable random numbers.

The respective random number generating circuits 200-1, 200-2, 200-3, 200-4 differ from each other in the frequency of the basic clock of the shift register 220 thus further enhancing the randomness of random numbers generated by the respective random number generating circuits 200-1, 200-2, 200-3, 200-4. In this case, the respective random number generating circuits 200-1, 200-2, 200-3, 200-4 differ from each other also in the frequency of a serial signal outputted from the output circuit 230.

Further, the respective random number generating circuits 200-1, 200-2, 200-3, 200-4 differ from each other in an output stage of the flip-flop 222 from which a value of the flip-flop 222 is inputted to an exclusive-OR circuit 223 thus forming a different feedback path 221 whereby the randomness of the random numbers generated by the random number generating circuit 200 can be further enhanced.

Further, the randomness of the random numbers can be enhanced also by changing the number of stages of the flip-flop 222 among the respective random number generating circuits 200-1, 200-2, 200-3, 200-4. In this case, the frequency of the serial signal outputted from the output circuit 230 also differs among the respective random number generating circuits 200-1, 200-2, 200-3, 200-4.

Here, to reduce electromagnetic wave noises attributed to the generation of the random numbers, the basic clocks inputted to the respective shift registers 200-1 to 200-4 may be formed of an intermittent drive clock which intermittently repeats stopping thereof.

Figure 17A:
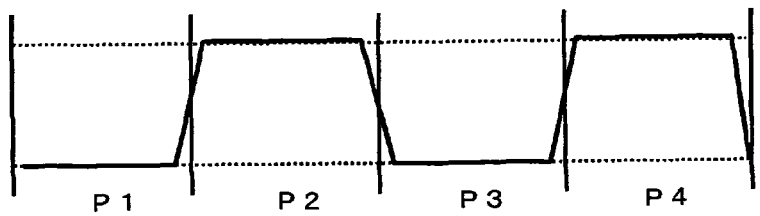
FIG. 17A and FIG. 17B are waveforms showing an outputted radio waves of the random number generating circuit used in the liquid crystal display device of the embodiment according to the present invention.

Next, FIG. 17A shows an output waveform of the output circuit 230. For example, studied is a case in which a voltage of a signal outputted from the output circuit 230 is continuously changed such that the output circuit 230 outputs the signal of low level during a period P1, outputs the signal of high level during a period P2, and outputs the signal of low level during a period P3.

Figure 17B:
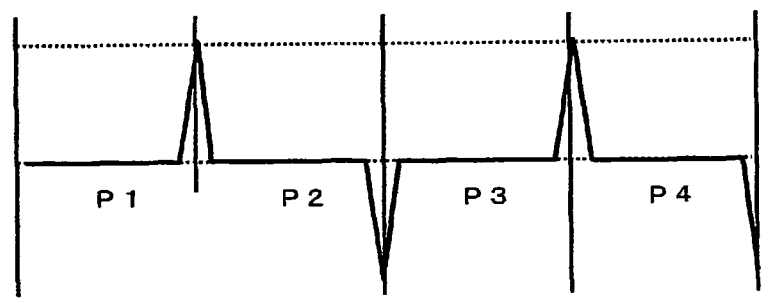

At a boundary between the period P1 and the period P2, the voltage is sharply elevated and hence, an radio waves having waveforms shown in FIG. 17B is generated as electromagnetic wave noises. On the other hand, also at a boundary between the period P2 and the period P3, the voltage is sharply decreased thus generating such an radio waves.

Figure 18:
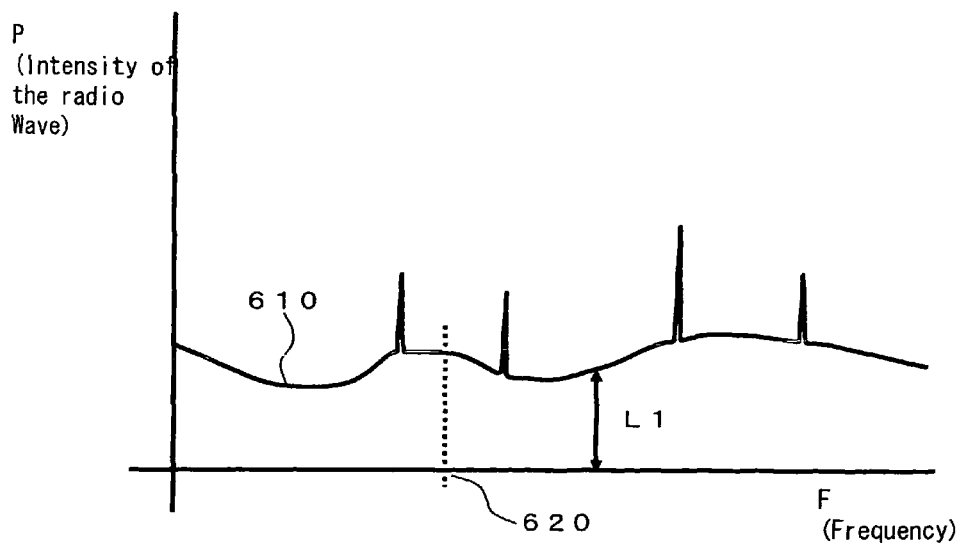
FIG. 18 is a frequency characteristic diagram showing a relationship between frequency and intensity of the radio waves generated from the liquid crystal display device of the embodiment according to the present invention.

Further, in the same manner as the output circuit 230, an radio waves is generated also by the digital signal 446 which is transmitted between the image integrating circuit 451 and the control circuit 3 described previously. FIG. 18 shows one example of a measurement result of a frequency F and intensity P of an radio waves 610 generated from the liquid crystal display device 100 due to the digital signal 446 or the like. In the drawing, symbol L1 indicates average intensity of the radio waves 610 generated from the liquid crystal display device 100.

It is understood from the drawing that noises are generated not only at a basic frequency 620 of the digital signal 446 but also over the whole frequencies.

Figure 19:
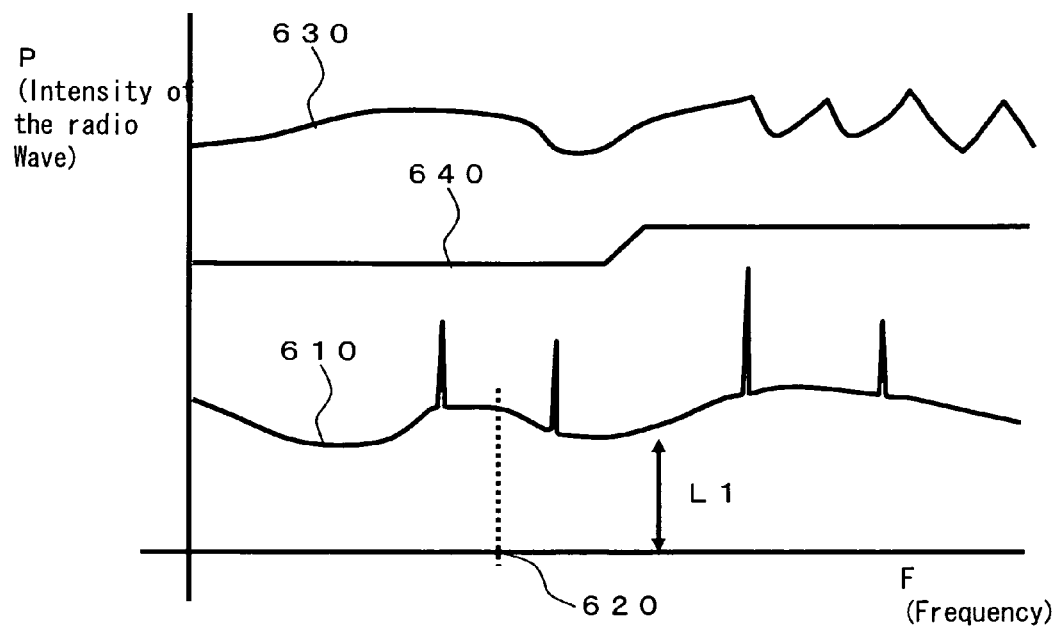
FIG. 19 is a frequency characteristic diagram showing the relationship between frequency and intensity of the radio waves generated from the liquid crystal display device of the embodiment according to the present invention before taking a countermeasure.

FIG. 19 shows a mode of an radio waves 630 generated when the transmission line 201 is provided to the output circuit 230. The intensity of the radio waves 630 generated by the random number generating circuit 200 is larger than limit radio waves intensity 640 of EMI and hence, the radio waves 630 reaches a level which causes a drawback as noises.

The present inventors have made, first of all, as a countermeasure to cope with electromagnetic wave noises, an attempt in which the radio waves 610 generated from the liquid crystal display device 100 due to the digital signal 446 or the like shown in FIG. 18 is reduced so as to reduce the radio waves 630 generated by the random number generating circuit 200 shown in FIG. 19.

Figure 20:
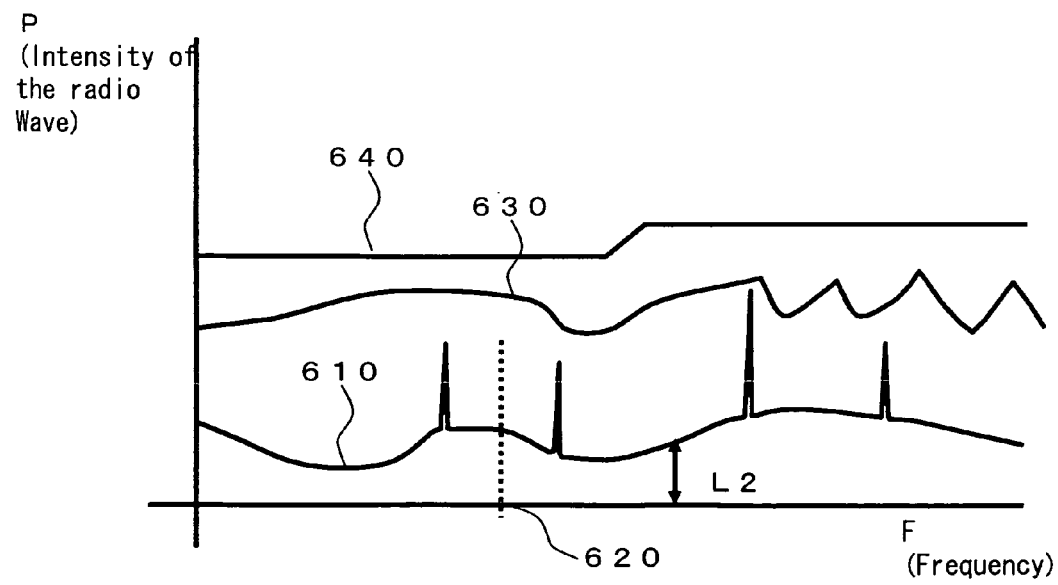
FIG. 20 is a frequency characteristic diagram showing a relationship between frequency and intensity of the radio waves generated from the liquid crystal display device of the embodiment according to the present invention.

The radiowaves 610 shown in FIG. 20 indicate an output waveform of the digital signal 446 to which the countermeasure against noises is applied. In FIG. 20, a countermeasure such as a shield is provided to the liquid crystal display device 100 and, further, an inversion control signal (noise control signal) NCOL which controls the inversion number of the digital signal 446 is added thus reducing the radio waves 610 generated from the liquid crystal display device 100 whereby average intensity of the radio waves 610 can be reduced as indicated by symbol L2 shown in the drawing. Further, the radio waves 630 generated by the random number generating circuit 200 is also reduced by using the clock which intermittently repeats stopping thereof as the basic clock. Further, an attenuator or the like is provided to an output of the output circuit 230 so as to set the intensity of the radio waves 630 to the limit radio waves intensity 640 of the EMI or below.

As shown in FIG. 20, the intensity of the radio waves 630 generated by the random number generating circuit 200 is the limit radio waves intensity 640 of the EMI or below, and the radio waves 630 can cover the whole frequency band of the radio waves 610 generated from the liquid crystal display device 100. Accordingly, the radiowaves 630 generated by the random number generating circuit 200 can prevent the radiowaves 610 generated from the liquid crystal display device 100 from being outputted to the outside.

The reason that the radio waves 630 generated by the random number generating circuit 200 can cover the whole frequency band is that the randomness of the random number generating circuit 200 is high, and even when the digital signal 446 is transmitted through the shift register 220 with the basic frequency 620 of the digital signal 446, by providing n pieces of shift registers 220 thus outputting n-times frequency by the output circuit 230, the random numbers which fall within a frequency band which is n times as large as the basic frequency 620 can be generated.

Figure 21:
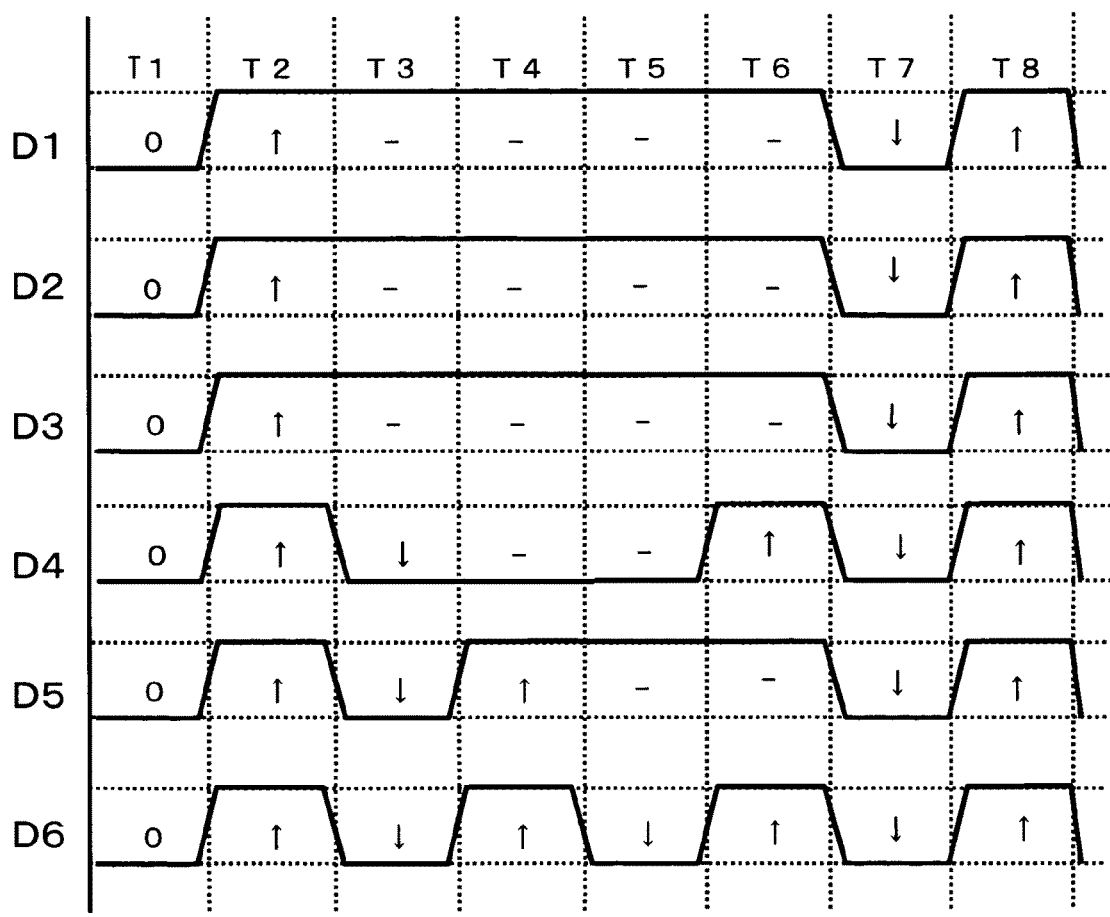
FIG. 21 is a schematic waveform showing a waveform of a digital signal transmitted in the liquid crystal display device of the embodiment according to the present invention.
Figure 22:
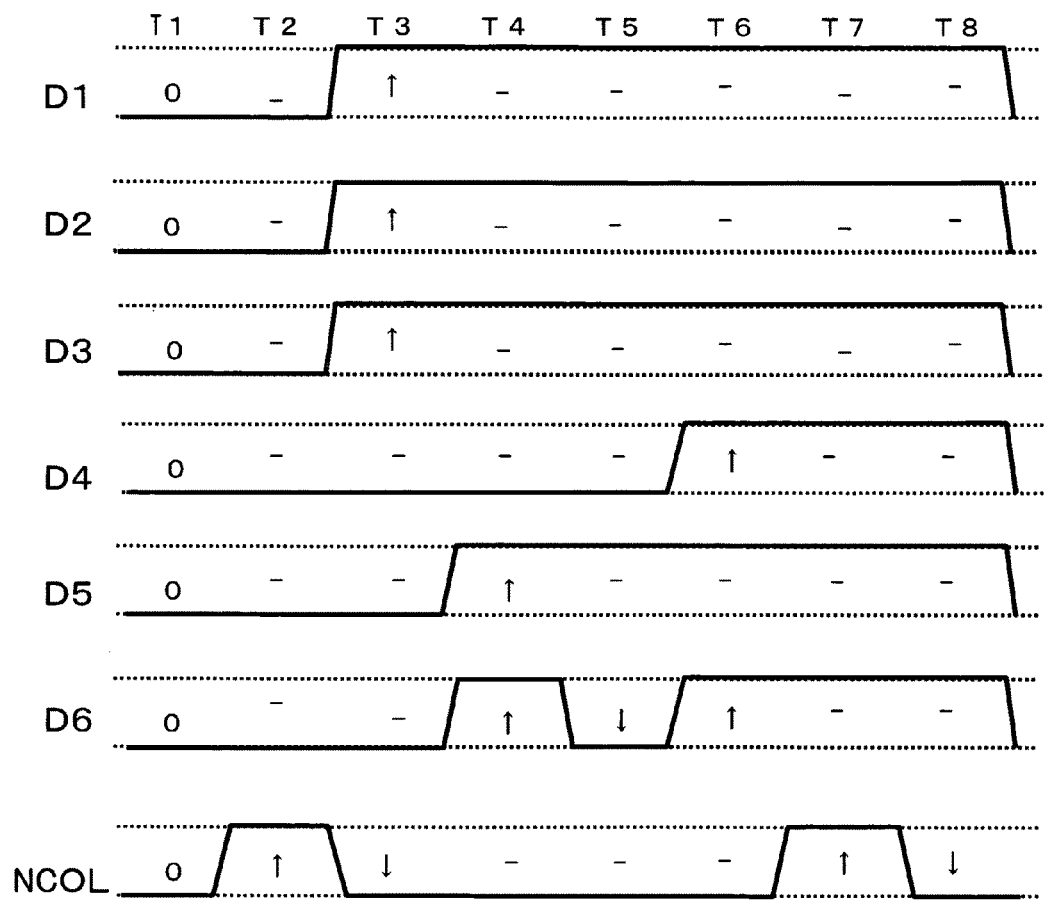
FIG. 22 is a schematic waveform showing a waveform of a digital signal transmitted in the liquid crystal display device of the embodiment according to the present invention.

Next, the noise control signal NCOL is explained in conjunction with FIG. 21 and FIG. 22. FIG. 21 shows the change of 6-bit digital signal 446 from a period T1 to a period T8. In the period T1, the values of the digital signal 446 are (0, 0, 0, 0, 0, 0) and hence, a voltage of each signal line is a low voltage.

Subsequently, in the period T2, the values of the digital signal 446 are (1, 1, 1, 1, 1, 1) and hence, voltages of all signal lines is changed from a low voltage to a high voltage. As described previously, the electromagnetic wave noises are generated due to the change of the voltage and hence, a change from the period T1 to the period T2 which brings about the change of voltage in all signal lines provides a worst pattern with respect to the electromagnetic wave noises.

Next, in a change from the period T2 to the period T3, 3 bits which are a half of 6 bits are changed such that the voltage is changed from the high voltage to the low voltage in bits D4 to D6. In a change from the period T3 to the period T4, 2 bits which are less than a half of 6 bits are changed such that the voltage is changed from the low voltage to the high voltage in bits D5 and D6.

FIG. 22 shows a case in which the noise control signal NCOL is added to the digital signals. In FIG. 22, when a change of voltage occurs in most of bits D1 to D6 as indicated by a change from the period T1 to the period t2, the noise control signal NCOL is set to "1" so that bits D1 to D6 output a voltage of polarity opposite to polarity of the original voltage. For example, although all bits are assumed to exhibit a high voltage during the period T2, all bits are set to a low voltage.

Next, during the period T3, the bits D1 to D3 assume a high voltage, and the bits D4 to D6 assume a low voltage. However, the change of voltage takes place in the half of 6 bits and hence, the original voltage is outputted by setting the noise control signal NCOL to "0" whereby the bits D1 to D3 assume a high voltage and the bits D4 to D6 assume a low voltage.

Next, in a change from the period T3 to the period T4, the number of bits where the voltage is changed is 2 bits which is less than the half of 6 bits and hence, the original voltage is outputted by setting the noise control signal NCOL to "0" whereby the bits D1 to D3 assume a high voltage, the bit D4 assumes a low voltage, and the bits D5 and D6 assume a high voltage.

In the control performed using the noise control signal NCOL shown in FIG. 22, when the voltage is changed in a large number of signal lines, the signal is controlled such that the voltage is not changed and hence, the change of voltage can be suppressed. In FIG. 22, the number of arrows which indicate the change of the voltage is 12 and hence, the number of arrows is largely reduced compared to the number of arrows shown in FIG. 21 which is 26.

In this manner, by lowering levels of electromagnetic wave noises generated from the original digital signal 446 using the noise control signal NCOL, it is possible to reduce the radio waves 610 generated from the liquid crystal display device 100 as shown in FIG. 20.

When the electronic wave 610 generated from the liquid crystal display device 100 can be reduced, it is also possible to reduce the radio waves 630 generated by the random number generating circuit 200 which can conceal the radio waves 610 generated from the liquid crystal display device 100 and hence, the intensity of the radio waves 630 generated by the random number generating circuit 200 can be suppressed to a level lower than the limit radio waves intensity 640 of the EMI.

Although the case in which 6-bit digital signal 446 is used has been explained as an example, the present invention is not limited to the 6-bit digital signal. For example, in inputting a 24-bit digital signal, when 13 bits or more are changed, the noise control signal NCOL is used so as to suppress the voltage change of the digital signal 446, while in inputting a 18-bit digital signal, when 10 bits or more are changed, the noise control signal NCOL is used so as to suppress the voltage change of the digital signal 446.

The above-mentioned explanation has been made to explain a typical function of the noise control signal NCOL. However, functions which the noise control signal NCOL possesses are not limited to such a function. That is, the noise control signal NCOL may be used in combination with the inversion of the display data or the like. In other words, an essential role of the noise control signal NCOL is to control a change quantity of the display data.

That is, the noise control signal NCOL can change the intensity of electromagnetic wave noises by suppressing the change quantity of the display data signal and, at the same time, can reduce the power consumption of the liquid crystal display device 100.

The utilization of a vacant terminal (empty cable or the like) of a connector of an interface which connects information devices or the like as a signal line for transmitting the noise control signal NCOL is considered as an effective way with no waste. However, a terminal (cable or the like) for the noise control signal NCOL may be provided intentionally. Further, with respect to the arrangement of the interface cable and the signal line for transmitting the noise control signal NCOL on the printed circuit board for driving the liquid crystal display device 100, these lines may preferably arranged adjacent to the display data line to acquire a more advantageous effect. However, the arrangement of these lines is not limited to such an arrangement.

Further, the number of signal lines which transmit the noise control signal NCOL is not limited to one. That is, it may be possible to adopt the circuit constitution in which a plurality of signal lines are arranged, and a total change quantity of display data is made uniform for every display data transmitting timing. Here, by making the change quantity of the display data uniform, the intensity of an electromagnetic field leaked from the liquid crystal display device 100 can be also made uniform.

Next, the basic clocks of the random number generating circuit are explained in conjunction with FIG. 23A to FIG. 23D. A display data transmission clock generated by the control circuit 3 or a clock generated by the control circuit 3 is used as the basic clock.

Figure 23A:
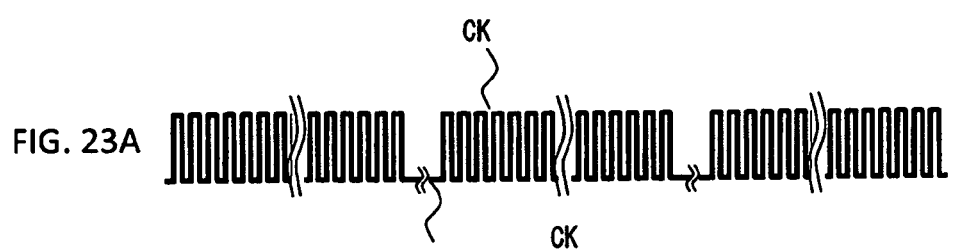
FIG. 23A to FIG. 23D are schematic view showing a waveform of a display data transmission clock and a transmission clock of shift register generated in the liquid crystal display device of the embodiment according to the present invention.

FIG. 23A shows the display data transmission clock. Although the display data transmission clock is a clock which plays a role of supplying the display data to the drive circuit 6 from the control circuit 3, the supply of the display data is unnecessary during a period in which the clock does not contribute to the display region 9, that is, during a retracing period 51 and hence, the clock may be stopped for the purpose of low power consumption. By using the display data transmission clock as the basic clock of the random number generating circuit 200, the generation of the random number can be stopped during the retracing period 51 and hence, the electromagnetic wave noises 630 can be reduced.

FIG. 23A indicates a waveform of the display data transmission clock when outputting of the clock is stopped during the retracing period 51. However, the clock may be continuously outputted during the retracing period 51. That is, provided that the display data transmission clock satisfies the condition that the intensity of the radiowaves 630 generated by the random number generating circuit 200 is equal to the limit radio waves intensity 640 of the EMI or below, the display data transmission clock which is continuously outputted can be used.

Figure 23B:

FIG. 23B shows a waveform of the display data transmission clock which is continuously outputted without interrupting the basic clock generated by the control circuit 3. In this case, the random number generated by the random number generating circuit 200 is continuously outputted and hence, the reduction of the output radio waves 630 generated by the random number generating circuit 200 cannot be expected. However, provided that such a display data transmission clock satisfies the condition that the intensity of the radio-waves 630 generated by the random number generating circuit 200 is equal to the limit radio waves intensity 640 of the EMI or below in the same manner as the display data transmission clock continuously outputted, the display data transmission clock which is continuously outputted can be also used.

Figure 23C:
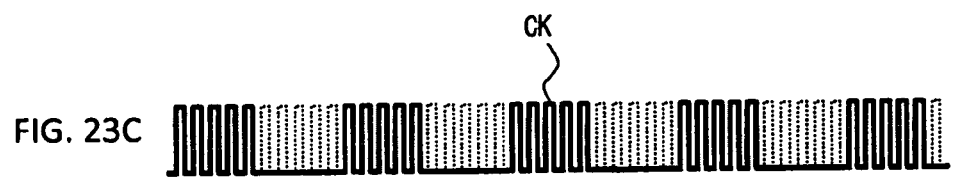

FIG. 23C shows a waveform of a display data transmission clock when the basic clock generated by the control circuit 3 is intermittently stopped, wherein the waveform is formed by repeating outputting of 5 clocks and stopping of 5 clocks. This waveform is similar to the waveform of the display data transmission clock when the clock is stopped during the retracing period. Since the generation of the random numbers from the random number generating circuit 200 is also stopped during the clock stopping period, the radio waves 630 can be reduced. Outputting of the waveform which intermittently stops the clock can be easily realized, and the waveform which intermittently stops the clock is not limited to such a waveform.

Figure 23D:
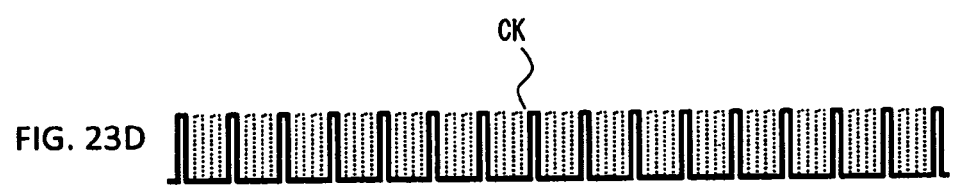

FIG. 23D is a waveform obtained by repeating outputting of 1 clock and stopping of 2 clocks based on the basic clock. In the same manner as such a waveform, a frequency of the basic clock may be substantially lowered thus realizing a waveform substantially equal to the clock which changes a duty ratio. This clock is also provided with a clock stopping period so that the radio waves 630 can be reduced.

The stopping period of the basic clock is provided for generating the radio waves 630 by the random number generating circuit 200 which realizes covering of the radio waves 610 generated from the liquid crystal display device 100 over the whole frequency band as low as possible. That is, the level of the radio waves 630 generated by the random number generating circuit 200 can be adjusted by adjusting the intermittent period of the basic clock.

Figure 24:
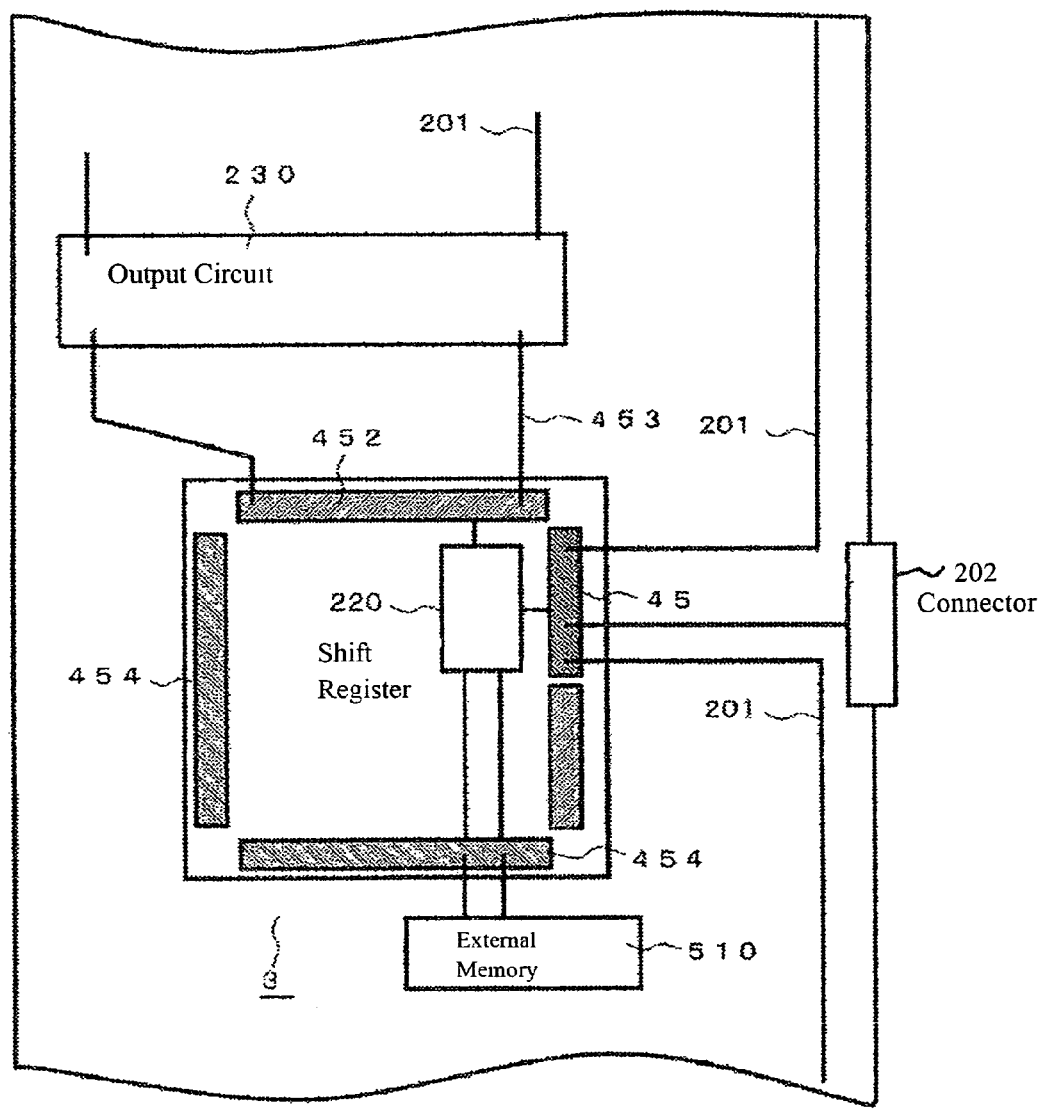
FIG. 24 is a schematic profile showing the arrangement of terminals of a control circuit of the liquid crystal display device of the embodiment according to the present invention.

Next, FIG. 24 shows the arrangement of terminals when the shift register 220 is provided in the control circuit 3 and the output circuit 230 is provided outside the control circuit 3. Numerals 452 to 454 indicate the arrangement positions of the terminals connected with the shift register 220. The terminal which is arranged at the terminal position 452 is connected with the output circuit 230, and a signal inputted to the output circuit 230 is outputted to the transmission line 201 from the output circuit 230 as the random numbers.

The transmission line 201 plays a role of an antenna and can control the intensity of the radio waves 630 generated by the random number generating circuit 200 by changing a shape or the arrangement of the transmission line 201. Here, an attenuator or the like may be connected to the transmission line 201 for reducing the intensity of the radio waves 630.

The terminal arranged at the terminal position 453 directly takes out an output of the shift register 220, and the output before increasing a frequency by the output circuit 230 is transmitted to the transmission line 201. By transmitting the output before increasing the frequency to the transmission line 201, it is possible to broadly output the radio waves on a low frequency side.

Further, numeral 202 indicates a connector for external connection which is used when the transmission line 201 is arranged outside. The terminal arranged at the terminal position 453 is used for connection with the connector 202 for external connection. The terminal at the terminal position indicated by numeral 454 is used for connection with an external memory element 510 which stores the initial value, for example.

Although the embodiment in which the present invention is applied to the liquid crystal display device has been explained heretofore, the present invention is not limited to such an embodiment. For example, the present invention is applicable to display devices in general including an organic EL display device.

Although the invention made by inventors of the present invention has been specifically explained based on the embodiment, it is needless to say that the present invention is not limited to such embodiment, and various modifications can be made without departing from the gist of the present invention.

What is claimed is:

1. A display device comprising:
a display panel;
a drive circuit driving respective pixels of the display panel; and
a control circuit supplying display data to the drive circuit,
wherein the control circuit includes a random number generating circuit, the random number generating circuit includes an output circuit which increases a frequency of a pulse signal generated by the random number generating circuit n times, where n is an integer greater than one, and outputs a pulse signal of n-times increased frequency, the random number generating circuit includes n pieces of shift registers, a basic clock for n pieces of shift registers is an intermittent drive clock which intermittently alternates between a clock stopping period during which the random number generating circuit stops generating a random number and a clock outputting period, the basic clock being configured to controllably adjust an intermittent period thereof so as to control a level of radio waves generated by the random number generating circuit, and the control circuit outputs an inversion control signal indicative of inversion of the display data.

2. A display device according to claim 1, wherein the basic clock is a clock which is in synchronism with a transmission clock of the display data.

3. A display device according to claim 1, wherein the basic clock is a clock which is in asynchronism with a transmission clock of the display data.

4. A display device according to claim 1, wherein the random number generating circuit includes a register which stores n pieces of initial values.

5. A display device comprising:
a display panel;
a drive circuit which drives respective pixels of the display panel;
a control circuit which outputs display data to the drive circuit;
a random number generating circuit which is provided to the control circuit;
a memory element which stores initial values of the random number generating circuit; and
an electromagnetic wave noise generating circuit into which signals generated by the random number generating circuit are inputted,
wherein the random number generating circuit includes n pieces of shift registers (where n is an integer greater than one), a basic clock of n pieces of shift registers is an intermittent drive clock which intermittently alternates between a clock stopping period during which the random number generating circuit stops generating a random number and a clock outputting period, the basic clock being configured to controllably adjust an intermittent period thereof so as to control a level of radio waves generated by the random number generating circuit, and the control circuit outputs an inversion control signal indicative of inversion of the display data.

6. A display device according to claim 5, wherein the basic clock is a clock which is in synchronism with a transmission clock of the display data.

7. A display device according to claim 5, wherein the basic clock is a clock which is in asynchronism with a transmission clock of the display data.

8. A display device according to claim 5, wherein the random number generating circuit includes a register which stores n pieces of initial values.

9. A display device according to claim 5, wherein the random number generating circuit includes an output circuit which is connected to n pieces of shift registers.

10. A display device comprising:
a display panel;
a touch panel which overlaps with the display panel in plane;
a drive circuit which drives respective pixels of the display panel;
a control circuit which outputs display data to the drive circuit;
a random number generating circuit which is provided to the control circuit;
a memory element which stores initial values of the random number generating circuit; and
an electromagnetic wave noise generating circuit into which signals generated by the random number generating circuit are inputted,
wherein the random number generating circuit includes n pieces of shift registers (where n is an integer greater than one), a basic clock of n pieces of shift registers is an intermittent drive clock which intermittently alternates between a clock stopping period during which the random number generating circuit stops generating a random number and a clock outputting period, the an electromagnetic wave noise circuit changes frequency of signals generated by the random number generating circuit, the basic clock being configured to controllably adjust an intermittent period thereof so as to control a level of radio waves generated by the random number generating circuit, and the control circuit outputs a noise control signal and controls the number of inversion of the display data.

11. A display device according to claim 10, wherein the basic clock is a clock which is in synchronism with a transmission clock of the display data.

12. A display device according to claim 10, wherein the basic clock is a clock which is in asynchronism with a transmission clock of the display data.

13. A display device according to claim 10, wherein the random number generating circuit includes a register which stores n pieces of initial values.

14. A display device according to claim 10, wherein the random number generating circuit includes an output circuit which is connected to n pieces of shift registers.

* * * * *